UNITED STATES PATENT OFFICE.

JACOB LIGHTER, OF CLAY VILLAGE, KENTUCKY.

IMPROVEMENT IN MEDICINAL COMPOUNDS TO CURE HOG-CHOLERA.

Specification forming part of Letters Patent No. 31,723, dated March 19, 1861.

*To all whom it may concern:*

Be it known that I, JACOB LIGHTER, of Clay Village, Shelby county, Kentucky, have discovered a new and useful antidote or remedy for the disease known as "hog-cholera;" and I hereby declare the same to consist of the following ingredients in the proportions stated, to wit: of calomel, ten grains; copperas, ten grains; wormseed-oil, ten drops. The above constitutes an ordinary dose for one animal, and is to be administered once a day until the disease is abated, the quantity, however, and the proportions also, may be slightly varied, according to the stage of the disease.

The primary symptoms of the above disease which indicate the necessity for the remedy consist of an indisposition for food, restlessness, and a drooping of the head, accompanied by stiffness, and sometimes blindness, and in the latter stages the urine is mixed with blood.

I claim as new and of my invention--

The use of the compound above described, to be administered to swine for the cure of the disease known as "hog-cholera."

In testimony of which invention I hereunto set my hand.

JACOB LIGHTER.

Witnesses:
GEO. H. KNIGHT,
FRANCIS MILLWARD.